United States Patent [19]
Wikander

[11] Patent Number: 6,031,295
[45] Date of Patent: Feb. 29, 2000

[54] AUTOMATIC SIREN DISRUPTER

[76] Inventor: Rob Wikander, 742 1st. St., Brookings, Oreg. 97415

[21] Appl. No.: 09/105,101

[22] Filed: Jun. 25, 1998

[51] Int. Cl.[7] .................................. B60L 1/00; B60Q 1/00
[52] U.S. Cl. .......................................... 307/10.1; 340/456
[58] Field of Search .................................. 307/10.1, 10.2, 307/10.3, 10.4, 10.5, 10.6; 340/132, 438, 456, 463

[56] References Cited

U.S. PATENT DOCUMENTS 5,659,289  8/1997  Zonkoski et al. ........................ 340/438

*Primary Examiner*—Jeffrey Gaffin
*Assistant Examiner*—Roberto Rios
*Attorney, Agent, or Firm*—Goldstein & Canino

[57] ABSTRACT

A siren disrupter, for use in a vehicle having a siren, having a parking brake, and having a gear selector having park and neutral positions. A parking brake switch is activated when the parking brake is engaged. A neutral switch is activated when the gear selector is place in one of the park and neutral positions. A siren control relay has a siren control relay switch and a siren control relay coil for controlling the siren control relay switch. The siren is supplied power through the siren control relay switch. When either the neutral switch or parking brake switch is activated, the siren control relay coil is energized to disconnect power to the siren and thereby deactivate the siren.

8 Claims, 2 Drawing Sheets

AUTOMATIC SIREN DISRUPTER

BACKGROUND OF THE INVENTION

The invention relates to an automatic siren disrupter. More particularly, the invention relates to a device for disabling a siren in an official vehicle when the vehicle is placed in park or the parking brake is engaged.

Many official vehicles, including, fire, police, and rescue employ sirens to warn vehicles and pedestrians that the official vehicle is approaching. This warning serves two purposes. First it cautions vehicles and pedestrians that the official vehicle is likely approaching at a high rate of speed. Second, it acts to request that other vehicles and pedestrians clear the roadway to allow the official vehicle to pass.

However, once the official vehicle is stopped at its final destination, the siren is no longer necessary. In fact, a blaring siren can actually inhibit rescue operations or other official activities by preventing official personnel from verbally communicating with each other. Thus it is desirable to shut off the siren as soon as the official vehicle arrives at the destination.

In many instances, the last thing police, fire, or rescue personnel are thinking of as they arrive at an emergency scene is that they must shut off their siren. In fact, simply placing their vehicle in park is perhaps the only thing that is done before the person abandons the vehicle to begin taking action at the emergency scene.

SUMMARY OF THE INVENTION

It is an object of the invention to produce a siren disrupter device which automatically deactivates a siren in an official vehicle once the vehicle has reached its destination.

It is another object of the invention to provide a siren disrupter device which deactivates the siren when the vehicle is placed into park. Accordingly, the disrupter device employs the neutral switch, which closes once the vehicle is placed in neutral or park, to deactivate the siren.

It is another object of the invention to provide a siren disrupter device which deactivates the siren when the parking brake in engaged. Accordingly, the disrupter device employs the parking brake switch, which closes once the parking brake is applied, to deactivate the siren.

It is a further object of the invention that the siren disrupter device is simplistic in construction, so that it may be inexpensively manufactured, may be easily installed into a vehicle, and will have a long useful life.

The invention is a siren disrupter, for use in a vehicle having a siren, having a parking brake, and having a gear selector having park and neutral positions. A parking brake switch is activated when the parking brake is engaged. A neutral switch is activated when the gear selector is place in one of the park and neutral positions. A siren control relay has a siren control relay switch and a siren control relay coil for controlling the siren control relay switch. The siren is supplied power through the siren control relay switch. When either the neutral switch or parking brake switch is activated, the siren control relay coil is energized to disconnect power to the siren and thereby deactivate the siren.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
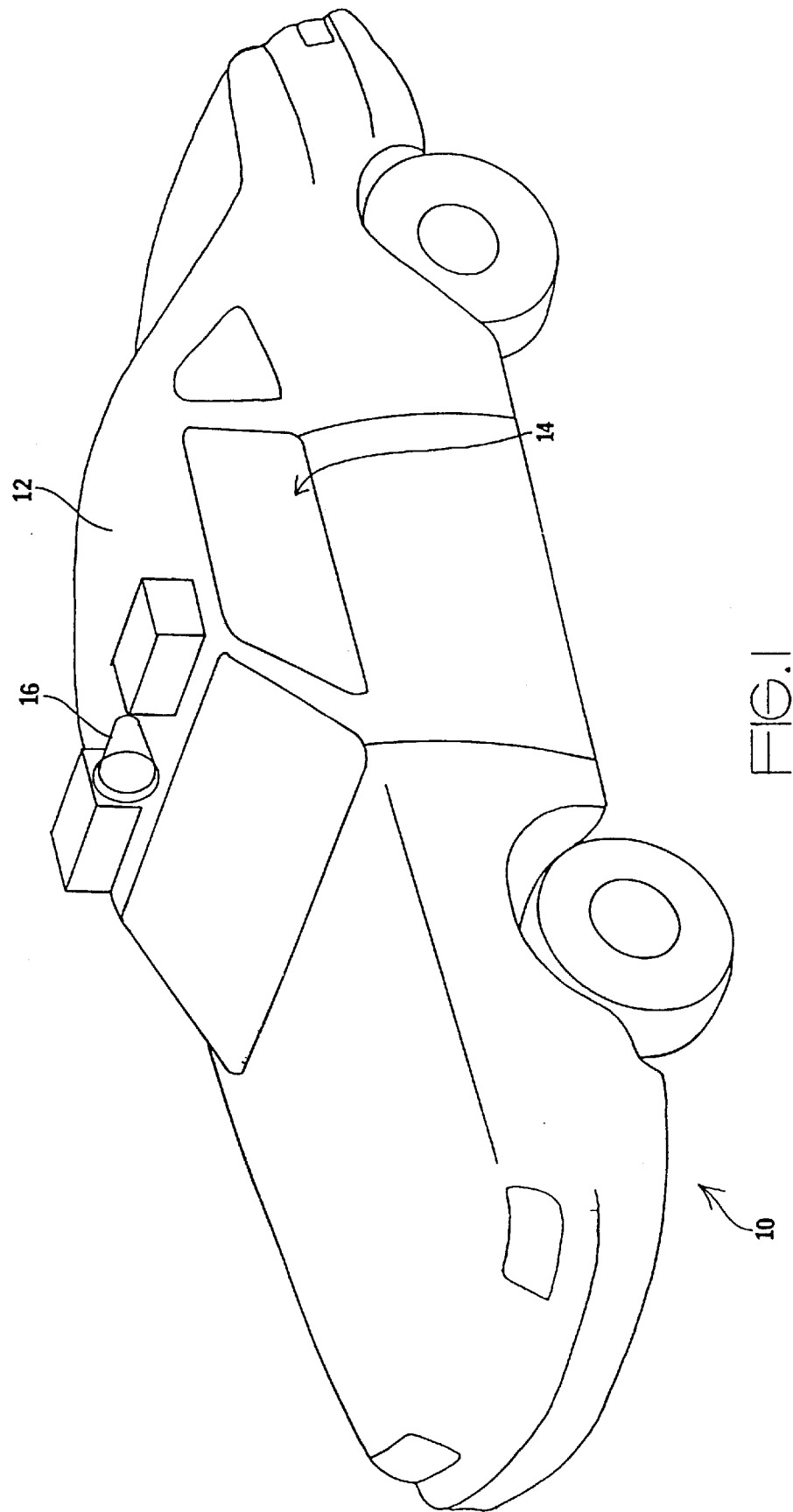
FIG. 1 is a diagrammatic perspective view, of an official vehicle, within which the invention is installed.

FIG. 1 illustrates an official vehicle 10. The vehicle has a top 12 and an interior 14. A siren 16 is mounted on the top 12 of the vehicle 10. Located within the interior 14 is a parking brake actuator pedal for activating a parking brake and a gear selector having "park" and "neutral" positions.

Figure 2:
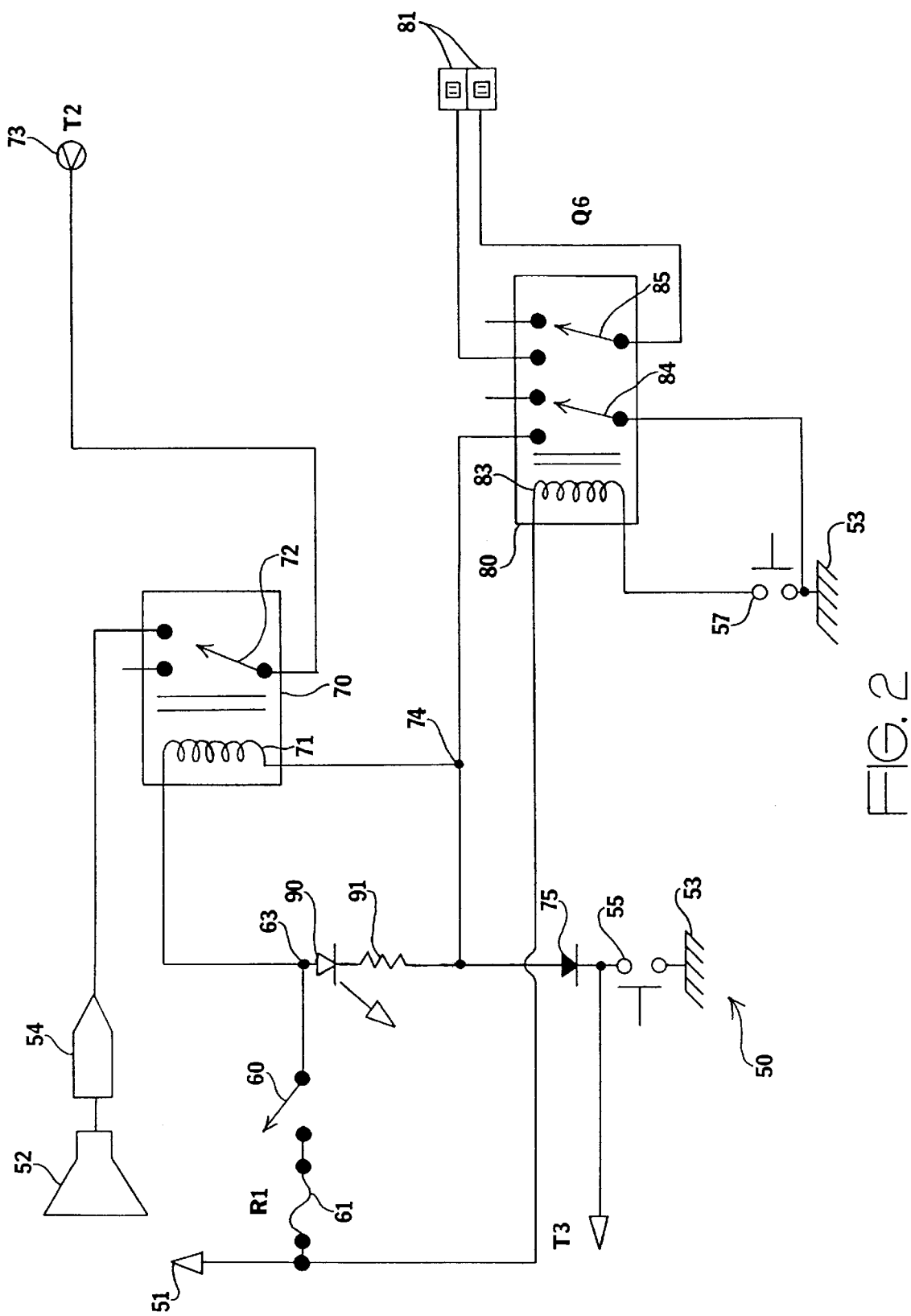
FIG. 2 is a schematic diagram illustrating the siren disrupter device, interconnected with various components of the vehicle electrical system.

FIG. 2 is a schematic diagram illustrating a siren disrupter 50. The vehicle has an ignition power source 51 and a ground 53, between which the siren disrupter 50 is generally connected. The vehicle has a siren 52 is driven by a siren driver 54. The vehicle also has a parking brake switch 55, which is linked to the parking brake actuator pedal, and a neutral switch 57 which is linked to the gear selector.

The parking brake switch 55 closes whenever the parking brake is actuated. The neutral switch 57 closes whenever the gear selector is in "park" or "neutral" positions. It is desirable to have the siren disrupted when either of the parking brake switch 55 and the neutral switch 57 are closed, because the closure of either switch indicates that the vehicle has been stopped, and the occupants are probably about to exit therefrom.

A power switch 60 is connected to the ignition power source 51 with a fuse 61 which serves to protect the siren disrupter 50 from overload damage. When the power switch 60 is closed, it provides power from the ignition power source 51 to a main power node 63.

A siren control relay 70 has a siren control relay coil 71 and a siren control relay switch 72. the siren control relay 70 is used to disrupt power to the siren driver 54 when the siren control relay coil 71 is energized. The siren control relay switch 72 is normally open, and is connected between a siren enablement node 73 and the siren driver 54. The siren enablement node would normally be connected to a switch within the vehicle which supplies power to the siren driver 54 when the siren 52 is activated.

The siren control relay coil 71 is connected to the main power node 63 at one end, and is connected indirectly to both the parking brake switch 55 and neutral switch 57 through a secondary power node 74 at the other end of said siren control relay coil 71. The parking brake switch 55 and neutral switch 57 are connected to ground. When the parking brake switch 55 and/or the neutral switch 57 are closed, the secondary power node 74 is pulled down to ground, energizing the siren control relay coil 71 and thus disabling the siren 52.

The manner in which the parking brake switch 55 and neutral switch 57 pull the siren control relay coil 71 down to ground, so that said coil 71 energizes, will now be described.

The parking brake switch 55 is connected to the ground connection 53 with a diode 75. An existing parking brake light wire 77 is connected between the parking brake switch 55 and the diode 75. The diode 75 is also connected to the secondary power node 74.

A neutral relay 80 is used so that the neutral switch 57 can both energize the siren control relay coil 71 and can close a pair of existing neutral switch contacts 81. Thus, the neutral relay 80 is preferably a DPDT or DPST relay. The neutral relay 80 thus has a neutral relay coil 83 and a neutral relay first switch 84 and a neutral relay second switch 85. The neutral relay coil 83 is connected between the ignition power source 51 and the neutral switch 57, which is then in turn connected to ground 53. Thus, closure of the neutral switch 57 energizes the neutral relay coil 83, and closes the neutral relay first switch 84 and neutral relay second switch 85. Upon installation of the siren disrupter 50, the existing neutral switch contacts 81 are removed from the neutral switch 57 and are connected between the neutral relay second switch 85. Thus, a closed circuit between the existing neutral switch contacts 81 is created when the relay energizes, for maintaining the existing purpose of the neutral switch—preventing the vehicle from being started when the vehicle is in a gear other than park or neutral. More importantly, the neutral relay first switch 84 connects the secondary power node 74 with ground 53 when the neutral relay coil 83 energizes and closes said neutral relay first switch 84. Once again, when the secondary power node 74 is connected with ground, the siren control relay coil 71 is energized to disrupt the siren 52.

An indicator light 90 is connected between the main power node 63 and the secondary power node 74. Typically an LED is used for the indicator light 90, since LED's do not contain filaments, and are thus more durable and better suited for use in vehicles. When the indicator light 90 is an LED, a current limiting resistor 91 must be connected in series therewith, as illustrated in FIG. 2.

To summarize the operation of the siren disrupter 50, power is supplied to the main power node 63 from the ignition power source 51 when the power switch 60 is closed. Said power is interruptable by the fuse 61 if an overload condition triggers said fuse 61.

When the parking brake switch 55 or the neutral switch 57 is closed, the secondary power node 74 is grounded, creating a voltage potential across the siren control relay coil 71, energizing said siren control relay coil 71 and disrupting power to the siren driver 54, thus deactivating the siren 52. The indicator light 90 is also illuminated to indicate that the siren disrupter 50 is functioning to deactivate the siren 52.

In conclusion, herein is presented a siren disrupter which installs within in an official vehicle having a siren to disrupt said siren when either the vehicle is placed in park, or the parking brake is engaged.

What is claimed is:

1. A siren disrupter, for use in a vehicle having a siren, a gear selector having park and neutral positions, and a neutral switch engaged with the gear selector, said neutral switch activates when the gear selector is in one of the park and neutral positions, comprising:

a siren control relay having a siren control relay coil and a siren control relay switch, the siren derives power through the siren control relay switch, the siren control relay switch activates to disconnect power to the siren when the siren coil is activated, the siren control relay coil is connected to the neutral switch so that the siren control relay coil is activated to deactivate the siren when then neutral switch is activated by placing the gear selector in one of the park and neutral positions, and wherein an indicator light is connected across the siren control relay coil to indicate when the siren is disrupted.

2. The siren disrupter as recited in claim 1, wherein the vehicle further has a parking brake switch which activates when the parking brake is activated, and wherein the siren control relay coil activates when the parking brake switch is activated.

3. The siren disrupter as recited in claim 2, the vehicle having an ignition power source and a ground, and wherein the siren disrupter further comprises a main power node and a secondary power node, the main power node is connected to ignition power source, the siren control relay coil is connected between the main power node and secondary power node, and when one of the parking brake switch and neutral switch are activated the secondary power node is connected to ground.

4. The siren disrupter as recited in claim 3, wherein the siren disrupter further comprises a neutral relay, the neutral relay having a neutral relay coil and a neutral relay first switch, the neutral relay coil is connected between the ignition power source and the neutral switch, the neutral switch is also connected to ground so that when the neutral switch closes the relay coil is effectively connected between the ignition power source and ground, energizes, and closes the neutral relay first switch to connect the secondary power node with ground to activate the siren control relay coil.

5. The siren disrupter as recited in claim 4, the vehicle having existing neutral switch connections which would be connected to the neutral switch if the siren disrupter was not installed, the neutral relay having a neutral relay second switch which is controlled by the neutral relay coil, the existing neutral switch connections are selectively connected by the neutral relay second switch, so that when the neutral relay coil is energized the existing neutral switch connections are connected to each other.

6. A siren disrupter method, for use in an official vehicle having an ignition power source and ground, a siren and a gear selector having park and neutral positions, the gear selector also having a neutral switch, using a siren control relay having a siren control relay coil and a siren control relay switch, the siren derives power through the siren control relay switch, the siren control relay switch is connected at one end to the ignition power source, for deactivating the siren of the vehicle when the vehicle is stopped at a destination, comprising the steps of:

activating the neutral switch by placing the gear selector into one of the park and neutral positions; and then turning off the siren by connecting the siren control relay coil with ground by the neutral switch.

7. The siren disrupter method as recited in claim 6, wherein the vehicle has existing neutral switch connections, and wherein the steps as recited further comprise connecting the existing neutral switch connections in response to activation of the neutral switch.

8. The siren disrupter method as recited in claim 7, using a neutral relay having a neutral relay coil, a first neutral relay switch, and a second neutral relay switch, wherein the step of activating the neutral switch further comprises energizing the neutral relay coil;

wherein the step of connecting the siren control relay coil with ground is performed by connecting the secondary power node with ground through the first neutral relay switch; and wherein the step of connecting the existing neutral switch connections is performed by the neutral relay second switch.

* * * * *